March 16, 1926.
J. A. MARR
INTERNAL COMBUSTION ENGINE
Filed August 7, 1925
1,576,837
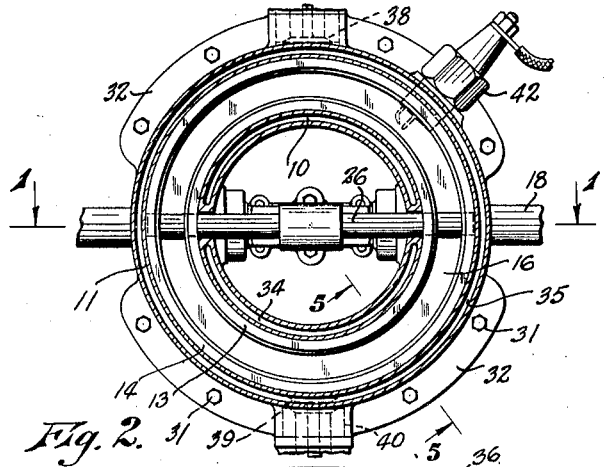
Fig. 2.
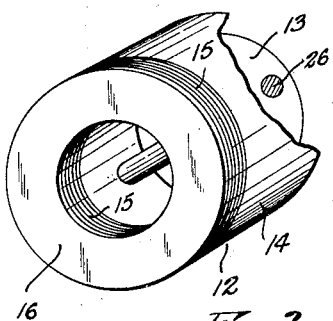
Fig. 3.
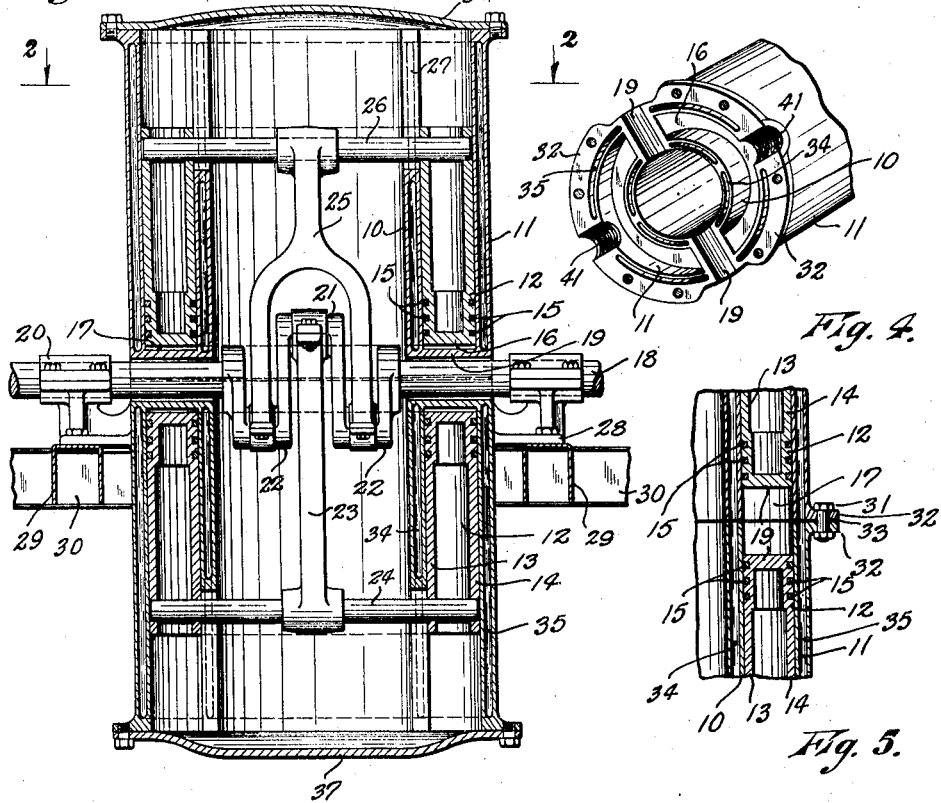
Fig. 1.
Fig. 4.
Fig. 5.
Inventor
James A. Marr
By Wooster & Davis
Attorneys.

Patented Mar. 16, 1926.

1,576,837

UNITED STATES PATENT OFFICE.

JAMES A. MARR, OF BRIDGEPORT, CONNECTICUT.

INTERNAL-COMBUSTION ENGINE.

Application filed August 7, 1925. Serial No. 48,805.

*To all whom it may concern:*

Be it known that I, JAMES A. MARR, a citizen of the United States, residing at Bridgeport, county of Fairfield, State of Connecticut, have invented a new and useful Internal-Combustion Engine, of which the following is a specification.

This invention relates to fluid pressure engines, particularly internal combustion engines, and has for an object to provide an engine in which the piston speed for any given number of revolutions is reduced one-half over that of the ordinary engines, and in which the engine is better balanced, thus reducing the vibration to a minimum.

It is also an object of the invention to provide a construction in which the parts are enclosed in such a way as to make the engine more compact, and in which the members are so arranged that the friction on the crank shaft bearings is greatly reduced over that of the ordinary engine.

With the foregoing and other objects in view, I have devised the construction illustrated in the accompanying drawing forming a part of this specification, similar reference characters being employed throughout the various figures to indicate corresponding elements. In this drawing, Fig. 1 is a vertical section through one cylinder of the engine substantially on line 1—1 of Fig. 2.

Fig. 2 is a transverse section substantially on line 2—2 of Fig. 1.
Fig. 3 is a perspective view of one of the pistons with a portion of one of the side walls being broken away.

Fig. 4 is a perspective view of the inner end of one of the cylinder sections, and Fig. 5 is a detailed section substantially on line 5—5 of Fig. 2.

The engine may comprise any desired number of units, generally called cylinders, of which one only is illustrated in the drawing. The unit shown comprises inner and outer concentric cylindrical walls 10 and 11 respectively which are spaced from each other to provide space for the pistons 12. These pistons as indicated comprise inner and outer walls 13 and 14 spaced from each other and located adjacent to the respective cylinder walls 10 and 11, and each of these piston walls carry the usual expanding piston rings 15 engaging the cylinder walls to provide tight connection therewith, as in the usual pistons. The inner and outer walls 13 and 14 of each piston are connected by a circular head 16, and the combustion chamber 17 is provided by the space between the heads of two of these pistons and the cylindrical walls 10 and 11.

The crank shaft 18 extends transversely through the sylinder walls 10 and 11 between the opposed heads 16 of the pistons, as indicated in Fig. 1. This crank shaft, of course, must not be exposed directly to the gases in the combustion chamber and tubes 19 are, therefore, provided connecting the inner and outer cylindrical walls 10 and 11 and passing through the combustion chamber 17, through which tubes the crank shaft extends. These tubes are preferably of a larger diameter than the crank shaft so as to leave an air space between the surface of the shaft and the walls of the tubes to prevent undue heating of the shaft. Said tubes may be water cooled if desired. The bearings for the crank shaft may be located in the tubes if desired, but it is preferred to locate them outside the cylinder, as indicated in Fig. 1, and it will, of course, be obvious that this crank shaft passes in the same manner through the other cylinders of the engine when a plurality of cylinders are used.

The shaft is provided with cranks 21 and 22 located within the inner cylinder 10 and they are enclosed thereby. The cranks are positioned on diametrically opposite sides of the shaft, and the upper crank 21 as shown in Fig. 1 is connected to the lower piston 12 by means of the connecting rod 23 and the cross pin 24 while the lower cranks 22 are connected to the upper piston 12 by means of the connecting rod 25 and the cross pin 26. These cross pins 24 and 26 extend across the inside of said inner cylinder 10 and into and through the inner walls 13 of the pistons, and may be extended if desired into the outer walls 14, as shown on the drawing. To allow for movement of these pins as the pistons reciprocate the walls of the inner cylinder 10 are provided with slots 27 adjacent their upper and lower ends through which these pins extend, and the slots may if desired form guides for the pins.

The engine units may be mounted by any suitable means, such as side brackets 28 resting on cross beams 29 connecting the side beams 30 of an automobile chassis, or in any other ways found desirable. To facilitate assembling of the various elements the cylinder comprising the outer and inner walls 10 and 11 is made in two sections with a divisional line substantiallly in the plane of the axis of the crank shaft, and these two sections may be clamped together by means of bolts 31 extending through the flanges 32 on the sections, a tight joint being secured by means of a gasket 33. One-half of the tube 19 will be in each section, as indicated in Fig. 4, and it may be cast integral with the outer and inner cylindrical members 10 and 11 thus providing a convenient means of tying these two members together and forming an integral structure. Both of the cylindrical walls 10 and 11 may be cooled by any of the well known means, and they are shown as hollow to provide water spaces 34 and 35 for circulation of cooling water in the usual manner, the spaces in the upper and lower sections being connected for this purpose. The opposite ends of the cylinders may be closed by the heads 36 and 37.

Suitable inlet and exhaust valves are provided for leading the combustible gases to the combustion chamber 17 and for removing the exhaust gases from the cylinder. These valves may be located as desired but are preferably mounted one on each side of the cylinders as indicated at 38 and 39 respectively in Fig. 2. These valves may be mounted in any suitable removable sleeves 40 mounted in the openings 41 in the outer cylindrical wall 11, as indicated in Fig. 4. The usual spark plug 42 is provided in the combustion chamber connected to the usual ignition devices.

The operation is as follows: It will be noted that as there are two pistons 12 and that as the combustion chamber 17 is located between the heads 16 of these pistons, when a charge of combustible gas is exploded in this chamber the pressure thereof will force the two pistons simultaneously in opposite directions, this movement being permitted because the pistons are connected to the cranks 21 and 22 located on diametrically opposite sides of the crank shaft. At the end of the outward movements the exhaust valve is opened by the usual valve operating mechanism, not shown, and the next movement of the pistons toward each other will force the exhaust gases from the combustion chamber. On the next outward movement of the pistons the exhaust valve will be closed and the inlet valve open so that the combustible mixture will be drawn into the combustion chamber. The next movement of the pistons toward each other will compress these gases, and they will be ignited at the proper time by the spark plug 42 to again force the pistons outwardly in opposite directions. Movement of the pistons will also cause air to flow in and out the tubes 19 about the crank shaft further assisting in preventing undue heating of this shaft.

It will be apparent from this operation the piston speed for any given number of crank shaft revolutions is reduced one hundred per cent over that of the piston speed of the ordinary engine using a single piston in each cylinder with a consequent reduction in vibration and friction, or in other words, with the same piston speed twice the number of crank shaft revolutions may be secured over that of the ordinary engine using a single piston in each cylinder. Also with my engine I secure twice the expansion of the gases with the same length of stroke for each individual piston. For this reason, for any given period of gas expansion the stroke of each piston and consequently the throw of each crank is but one-half of the stroke or crank throw of an engine using but one piston in each cylinder. Therefore, vibration and friction due to crank thrust are greatly reduced. Consequently, more power can be taken from the expanding gases without, as in the present engine whose cylinders have but one piston, making the crank so long as to cause excessive vibration and friction. Furthermore, as the two pistons are always acting in opposite directions, for example, one crank pulling up while the other crank is pulling down. they neutralize each other and side thrust is practically eliminated together with vibration which ordinarily results therefrom. Therefore, because of the above mentioned slower piston speed and the elimination of vibration and friction much higher speed of the crank shaft may be secured with greater efficiency.

Having thus set forth the nature of my invention, what I claim is:

1. An engine comprising spaced inner and outer cylinders, a pair of oppositely movable pistons mounted between said cylinders, a crank shaft located between said pistons provided with cranks located within the inner cylinder and disposed on opposite sides of the shaft, and connecting rods within said inner cylinder leading in opposite directions from said cranks and connected to the respective pistons.

2. An engine comprising spaced inner and outer cylinders, oppositely movable pistons mounted between said cylinders, a crank shaft extending transversely through the cylinders between the opposed heads of the pistons, tubes extending between the cylinders through which tubes the crank shaft passes, crank pins on the crank shaft within the inner cylinder, and connections from said pins to the respective pistons.

3. An internal combustion engine comprising inner and outer spaced concentric cylinders, a pair of oppositely movable pistons mounted between said cylinders and provided with spaced inner and outer side walls carrying piston rings engaging the walls of the respective cylinders, said pistons being provided with opposed heads joining their inner and outer side walls, which heads with the walls of the cylinders form a combustion chamber between them, a crank shaft extending transversely through the cylinders between the heads of the pistons and provided with crank pins within the inner cylinder disposed on opposite sides of the shaft, and connecting rods leading from said pins and connected to the respective pistons.

4. An engine comprising spaced inner and outer cylinders, a pair of oppositely movable pistons mounted between said cylinders, a crank shaft extending transversely through the cylinders between said pistons, cranks on said shaft within the inner cylinder, and connecting rods connecting the pistons with said cranks.

5. An engine comprising spaced inner and outer cylinders, a pair of oppositely movable pistons mounted between said cylinders, said pistons comprising inner and outer cylindrical walls each carrying piston rings engaging the cylinders and each provided with a head connecting said inner and outer walls forming a combustion chamber with the cylinder walls between said heads.

6. An engine comprising spaced inner and outer cylinders, a pair of oppositely movable pistons mounted between said cylinders, a crank shaft extending transversely through the cylinders between said pistons, tubes extending between the cylinders through the combustion chamber between the pistons and through which the shaft extends, cranks on said shaft within the inner cylinder and positioned on opposite sides of the shaft, transverse pins carried by the pistons, and connecting rods leading from said pins to the respective cranks.

7. An engine comprising spaced inner and outer cylinders, a pair of oppositely movable pistons mounted between said cylinders, a crank shaft extending tranversely through the cylinders betweens said pistons, cranks on the shaft within the inner cylinder, transverse pins carried by the pistons, said inner cylinder being provided with longitudinal slots for movement of the pins as the pistons reciprocate, and connecting rods connected to the cranks and the respective pins.

In testimony whereof I affix my signature.

JAMES A. MARR.